United States Patent
Yu et al.

(10) Patent No.: US 12,468,889 B2
(45) Date of Patent: Nov. 11, 2025

(54) MULTI-TASK SELF-TRAINING FOR CHARACTER GENDER IDENTIFICATION

(71) Applicant: TENCENT AMERICA LLC, Palo Alto, CA (US)

(72) Inventors: Dian Yu, Bellevue, WA (US); Linfeng Song, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 451 days.

(21) Appl. No.: 18/172,018

(22) Filed: Feb. 21, 2023

(65) Prior Publication Data

US 2024/0281608 A1  Aug. 22, 2024

(51) Int. Cl.
*G06F 40/284* (2020.01)
*G06V 30/19* (2022.01)
*G06V 30/416* (2022.01)
*G06V 30/10* (2022.01)

(52) U.S. Cl.
CPC ...... *G06F 40/284* (2020.01); *G06V 30/19127* (2022.01); *G06V 30/416* (2022.01); *G06V 30/10* (2022.01)

(58) Field of Classification Search
None
See application file for complete search history.

(56) References Cited

U.S. PATENT DOCUMENTS

| 11,694,029 B2* | 7/2023 | Malak ............... G06F 40/279 |
| | | 704/9 |
| 2019/0026548 A1* | 1/2019 | Varadarajan ........... G06V 40/10 |
| 2020/0334381 A1* | 10/2020 | Yarowsky ............ G06F 40/166 |
| 2021/0241350 A1* | 8/2021 | Mane ................. G06Q 30/0631 |
| 2022/0013120 A1* | 1/2022 | Netzer ................. G06V 10/70 |

FOREIGN PATENT DOCUMENTS

| CN | 104462053 B | 10/2018 |
| CN | 106503669 B | 10/2019 |

OTHER PUBLICATIONS

Dain Yu, et al., "End-to-End Chinese Speaker Identification," Proceedings of the 2022 Conference of the North American Chapter of the Association for Computational Linguistics: Human Language Technologies, Jul. 10, 2022, pp. 2274-2285 (12 pages total), https://web.archive.Org/web/20220710014743/https://aclanthology.org/2022.naacl-main.165.pdf.

(Continued)

*Primary Examiner* — Haris Sabah
(74) *Attorney, Agent, or Firm* — Sughrue Mion, PLLC

(57) ABSTRACT

A method and apparatus that identifies one or more characters within a text; determines one or more informative sections within the text, the one or more informative sections providing information regarding a gender of the one or more characters within the text; selects a most informative section from the one or more informative sections; extracts unlabeled instances corresponding to the gender of the one or more characters from the most informative section; iteratively trains a multi-task model using unlabeled corpora, the multi-task model performing both speaker identification and gender identification; and labels the gender of the one or more characters based on the extracted unlabeled instances and the multi-task model.

20 Claims, 16 Drawing Sheets

(56) References Cited

OTHER PUBLICATIONS

Benedict Neo, "BookNLP: Analyze Your Favorite Books with NLP," Medium, Dec. 12, 2022, 24 pages total, https://medium.com/bitgritdata-science-publication/booknlp-analyze-your-favorite-books-with-nlp-606367aa0930.
International Search Report issued Feb. 22, 2024 in Application No. PCT/US2023/032736.
Written Opinion issued Feb. 22, 2024 in Application No. PCT/US2023/032736.

\* cited by examiner

FIG. 7

| | |
|---|---|
| instance 1 | |
| context | In fact, he didn't ask much. Every time he passed through Shanghai, he could see her, see her small expression of guilt when she wanted to reject him, and force her to accompany him to eat and talk. enough. |
| | Chu Jian still wanted to continue the business, but was trampled by Tong Fei under the table, and immediately shut up and pointed at the pretty boy: "This, this Lin Shen is the newly signed artist by Feifei." |
| | Jian Bianlin slid his index finger halfway around the edge of the wine glass. |
| character | Lin Shen |
| gender | boy |
| instance 2 | |
| context | Even the opening conditions are very attractive. |
| | "Our company has bought the copyrights of several big IPs and wants to support newcomers," Xie Bin said, "I want to ask the screenwriters from your studio to write the script. Jian Bianlin is the starring role. In addition to bringing newcomers from our company, you can choose a supporting male role with a lot of roles, give it to this Lin Shen." |
| | Tong Fei coughed, her face flushed with excitement. Jian Bianlin stopped watching TV dramas recently, and focused on movies. If you are willing to accept it, it must be a super big production, especially easy to hold people. Being able to act with Jian Bianlin, at worst, has public familiarity! |
| character | Lin Shen |
| gender | male |

FIG. 9A

| metric | value |
|---|---|
| number of training instances | 13,780 |
| number of dev instances | 6,430 |
| number of characters* | 3,757 |
| number of books | 18 |
| average instances per character | 5.4 |

FIG. 9B

| dataset | subset | # of instances | # of character mentions[†] |
|---|---|---|---|
| clean data | | | |
| JY | train | 17,159 | 362 |
| | dev | 5,719 | 296 |
| | test | 5,719 | 285 |
| WP | train | 2,000 | 120 |
| | dev | 298 | 51 |
| | test | 298 | 42 |
| CLUEWSC | dev | 304 | 233 |
| | test_1.0 | 290 | 212 |
| CSI | train | 48,037 | 2,625 |
| | dev | 17,503 | 1,246 |
| CGI | train | 13,780 | 2,513 |
| | dev | 6,430 | 1,244 |
| noisy data | | | |
| corpus$_1$ | train | 141,251 | 8,945 |
| corpus$_2$ | train | 159,663 | 10,002 |
| corpus$_3$ | train | 187,324 | 13,041 |
| corpus$_4$ | train | 232,239 | 17,326 |

FIG. 10A

| method | # of model | EM↑ | F1↑ |
|---|---|---|---|
| Coref | -- | 69.0 | 70.0 |
| Copy | -- | 69.6 | 70.7 |
| T2T$_{CI}$ | T5$_{base}$ | 79.5 (0.4) | 80.9 (0.4) |
| T2T$_{CI}$ | BART$_{large}$ | 81.4 (0.7) | 83.4 (0.3) |
| T2T$_{CI}$ | DIALBART$_{large}$ | 82.5 (0.2) | 84.0 (0.1) |
| EXT$_{CI}$ | XLM | 78.2 (0.4) | 79.9 (0.2) |
| EXT$_{CI}$ | Roberta-large | 82.1 (0.1) | 83.8 (0.1) |
| EXT$_{CI}$ | MacBERT-large | 82.9 (0.3) | 84.6 (0.3) |

FIG. 10B

| id | method | initialization | weakly-labeled data source | # of epochs | CSI | CGI | Average |
|----|--------|----------------|----------------------------|-------------|-----|-----|---------|
| 1 | $EXT_{SI}$ | – | × | 5 | 90.2 (0.2) | – | – |
| 2 | $EXT_{GI}$ | – | × | 5 | – | 82.9 (0.3) | – |
| 3 | $EXT_{joint}$ | – | × | 3 | 90.2 (0.2) | 82.8 (0.2) | 86.5 |
| 4 | $EXT_{joint}$ | – | $corpus_1$ | 1 | 91.0 (0.1) | 83.4 (0.1) | 87.2 |
| 5 | $EXT_{joint}$ | 4 | $corpus_2$ | 1 | 91.0 (0.1) | 84.2 (0.3) | 87.6 |
| 6 | $EXT_{joint}$ | 5 | $corpus_3$ | 1 | 91.4 (0.0) | 84.3 (0.1) | 87.8 |
| 7 | $EXT_{joint}$ | 6 | $corpus_4$ | 1 | 91.5 (0.2) | 84.1 (0.2) | 87.8 |
| 4° | $EXT_{joint}$ | – | $corpus_1$ (CL) | 1 | 91.2 (0.1) | 83.5 (0.2) | 87.4 |
| 5° | $EXT_{joint}$ | 4° | $corpus_2$ (CL) | 1 | 91.4 (0.1) | 84.0 (0.3) | 87.7 |
| 6° | $EXT_{joint}$ | 5° | $corpus_3$ (CL) | 1 | 91.9 (0.0) | 84.2 (0.2) | 88.0 |
| 7° | $EXT_{joint}$ | 6° | $corpus_4$ (CL) | 1 | 92.2 (0.0) | 84.5 (0.0) | 88.3 |
| 8 | $EXT_{joint}$ | – | $corpus_{1 \to 2 \to 3 \to 4}$ (bottom) | 1 | 91.8 (0.1) | 84.6 (0.1) | 88.2 |
| 9 | $EXT_{joint}$ | – | $corpus_{1 \to 2 \to 3 \to 4}$ (mid) | 1 | 90.5 (0.2) | 83.8 (0.2) | 87.2 |
| 10 | $EXT_{joint}$ | – | $corpus_{1 \to 2 \to 3 \to 4}$ (top) | 1 | 89.4 (0.1) | 83.3 (0.2) | 86.3 |
| 11 | $EXT_{SI}$ | – | $corpus_{1 \to 2 \to 3 \to 4}$ | 1 | 91.9 (0.1) | – | – |
| 12 | $EXT_{GI}$ | – | $corpus_{1 \to 2 \to 3 \to 4}$ | 1 | – | 84.5 (0.1) | – |

FIG.10C

| id | method | initialization | weakly-labeled data source | # of epochs | CSI | CGI | Average |
|---|---|---|---|---|---|---|---|
| 1 | $T2T_{CI}$ | -- | X | 5 | 88.6 (0.3) | -- | -- |
| 2 | $T2T_{CI}$ | -- | X | 5 | -- | 82.5 (0.2) | -- |
| 3 | $T2T_{joint}$ | -- | X | 5 | 88.7 (0.2) | 82.3 (0.4) | 85.5 |
| 4 | $T2T_{joint}$ | -- | $corpus_{1\to2\to3\to4}$ (full) | 1 | 89.5 (0.1) | 83.7 (0.2) | 86.6 |
| 5 | $T2T_{joint}$ | -- | $corpus_{1\to2\to3\to4}$ (CL) | 1 | 89.0 (0.2) | 83.7 (0.2) | 86.3 |
| 6 | $T2T_{joint}$ | -- | $corpus_{1\to2\to3\to4}$ (bottom) | 1 | 88.8 (0.1) | 83.4 (0.2) | 86.1 |
| 7 | $T2T_{joint}$ | -- | $corpus_{1\to2\to3\to4}$ (mid) | 1 | 88.9 (0.2) | 83.0 (0.1) | 86.0 |
| 8 | $T2T_{joint}$ | -- | $corpus_{1\to2\to3\to4}$ (top) | 1 | 88.8 (0.2) | 82.9 (0.3) | 85.9 |
| 9 | $GEN_{CI}$ | -- | $corpus_{1\to2\to3\to4}$ | 1 | 89.3 (0.1) | -- | -- |
| 10 | $GEN_{CI}$ | -- | $corpus_{1\to2\to3\to4}$ | 1 | -- | 83.3 (0.1) | -- |

FIG.10D

| method | external context | WP dev | WP test | JY dev | JY test |
|---|---|---|---|---|---|
| Coref | N | 74.5 | 78.6 | 60.1 | 66.3 |
| Coref | Y | 72.5 | 76.2 | 64.2 | 64.2 |
| NB | N | 94.1 | 90.5 | 87.2 | 87.7 |
| $EXT_{joint}$ | N | 90.2 | 90.5 | 88.9 | 87.4 |
| $EXT_{joint}$ | Y | 98.0 | 90.5 | 93.2 | 93.7 |
| $EXT_{joint,semi}$ | N | 94.1 | 88.1 | 87.2 | 86.0 |
| $EXT_{joint,semi}$ | Y | 94.1 | 92.9 | 94.3 | 94.7 |

FIG. 10E

| | external context | dev | test_1.0 |
|---|---|---|---|
| NB | N | 55.4 | 48.1 |
| $EXT_{joint}$ | N | 89.7 | 85.8 |
| $EXT_{joint,semi}$ | N | 93.6 | 87.7 |

FIG. 10F

|  | P&P | Emma | The Steppe | AVG |
|---|---|---|---|---|
| $EXT_{GI}$ | 82.7 | 77.8 | 70.0 | 76.8 |
| $EXT_{GI_{semi}}$ | 84.6 | 80.0 | 80.0 | 81.5 |
| BookNLP | 84.6 | 75.6 | 76.7 | 79.0 |
| $BookNLP_{prior}$ | 86.5 | 80.0 | 80.0 | 82.2 |

MULTI-TASK SELF-TRAINING FOR CHARACTER GENDER IDENTIFICATION

TECHNICAL FIELD

The present disclosure provides a method for character gender identification within a text.

BACKGROUND

In traditional character-related datasets, the gender of each character is manually annotated. As it is expensive to annotate a book, and usually each book only has several hundreds of annotated characters, it is still difficult to construct high-quality large-scale gender identification (GI) datasets to support large-scale model training. For example, one of the most representative English datasets P&P based on the novel Pride and Prejudice is annotated by a student of English literature, and the binary gender label (M/F) is annotated for only 52 main characters. Limited by the size of annotated data, most existing methods rely on carefully designed heuristics and off-the-shelf tools such as named entity recognition (NER) and co-reference resolution for GI. For example, the number of male/female pronouns ("he" or "she") are counted for each character, followed by majority voting to decide the final gender label of each character. However, even the performance of the NER and coreference resolution models trained on literature corpora still perform worse than the state-of-the-art performance on resource-rich news documents, and pipeline solutions tend to lead error propagation.

Another widely adopted resource for GI is large-scale name-gender pairs, which may come from public government records and background websites. Inferring the gender of characters merely based on names can already achieve quite good performance for names that are entities. However, it may not be accessible or easily collected for a new language, and it is also not reliable and explainable. For example, "Yu Shuxia" is recognized as a women's name by method used in if only name information is considered. The present disclosure designs a new annotation guideline for GI to speed up human annotation that traditionally requires book-level understanding.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

The present disclosure provides a method of character gender identification within a text.

According to some embodiments, there is provided a method performed by at least one processor. The method includes identifying one or more characters within a text. The method further includes determining one or more informative sections within the text, the one or more informative sections providing information regarding a gender of the one or more characters within the text. The method further includes selecting a most informative section from the one or more informative sections. The method further includes extracting unlabeled instances corresponding to the gender of the one or more characters from the most informative section. The method further includes iteratively training a multi-task model using unlabeled corpora, the multi-task model performs both speaker identification and gender identification. The method further includes labeling the gender of the one or more characters based on the extracted unlabeled instances and the multi-task model.

According to some embodiments, an apparatus includes at least one memory configured to store program code and at least one processor configured to read the program code and operate as instructed by the program code. The program code includes identifying code configured to cause the at least one processor to identify one or more characters within a text. The program code further includes determining code configured to cause the at least one processor to determine one or more informative sections within the text, the one or more informative sections providing information regarding a gender of the one or more characters within the text. The program code further includes selecting code configured to cause the at least one processor to select a most informative section from the one or more informative sections. The program code further includes extracting code configured to cause the at least one processor to extract unlabeled instances corresponding to the gender of the one or more characters from the most informative section. The program code further includes training code configured to cause the at least one processor to iteratively train a multi-task model using unlabeled corpora, the multi-task model performs both speaker identification and gender identification. The program code further includes labeling code configured to cause the at least one processor to label the gender of the one or more characters based on the extracted unlabeled instances and the multi-task model.

According to some embodiments, a non-transitory computer-readable storage medium, stores instructions that, when executed by at least one processor, cause the at least one processor to identify one or more characters within a text. The instructions further cause the at least one processor to determine one or more informative sections within the text, the one or more informative sections providing information regarding a gender of the one or more characters within the text. The instructions further cause the at least one processor to select a most informative section from the one or more informative sections. The instructions further cause the at least one processor to extract unlabeled instances corresponding to the gender of the one or more characters from the most informative section. The instructions further cause the at least one processor to iteratively train a multi-task model using unlabeled corpora, the multi-task model performs both speaker identification and gender identification. The instructions further cause the at least one processor to label the gender of the one or more characters based on the extracted unlabeled instances and the multi-task model.

Additional embodiments will be set forth in the description that follows and, in part, will be apparent from the description, and/or may be learned by practice of the presented embodiments of the disclosure.

BRIEF DESCRIPTION OF THE DRAWINGS

The above and other features and aspects of embodiments of the disclosure will be apparent from the following description taken in conjunction with the accompanying drawings, in which:

FIG. 7 provides English translations of the annotated gender identification examples, according to some embodiments.

FIG. 9A is a table showing the statistics for number of instances according to some embodiments.

FIG. 9B is a table showing the statistics for continual multi-task self-training for gender identification, according to some embodiments.

FIG. 10A is a table showing single-task supervised performance, according to some embodiments.

FIG. 10B is a table showing multi-task extractive semi-supervised performance, according to some embodiments.

FIG. 10C is a table showing the multi-task text-to-text semi-supervised performance, according to some embodiments.

FIG. 10D is a table showing the zero-shot mention-level gender accuracy on WP and JY datasets, according to some embodiments.

FIG. 10E is a table showing the zero-shot mention-level gender accuracy on CLUEWSC dataset, according to some embodiments.

FIG. 10F is a table showing the zero-shot character-level gender accuracy, according to some embodiments.

DETAILED DESCRIPTION

Figure 1:
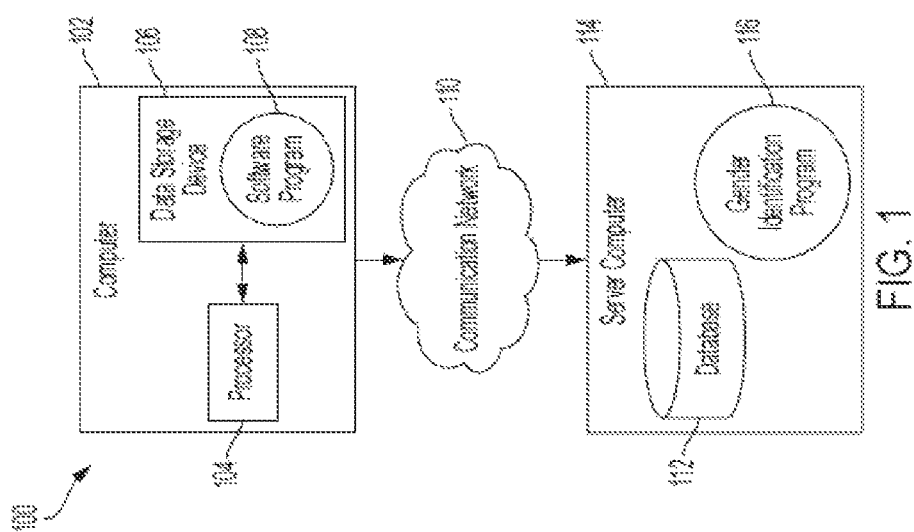
FIG. 1 is an illustration of a networked computer environment, according to some embodiments.

The following detailed description of example embodiments refers to the accompanying drawings. The same reference numbers in different drawings may identify the same or similar elements.

The following disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As it is expensive and time-consuming to annotate gender of characters in books, most existing datasets are small-scale and thus cannot support the training of powerful deep neural networks. Most previous methods rely on external large-scale name-gender knowledge and off-the-shelf named entity recognition and coreference resolution models trained on other types of corpora. The present disclosure simplifies gender identification as a span extraction task to (i) speed up the annotation procedure as only local context is needed and (ii) use the extracted spans that clearly indicate the gender of characters as pieces of evidence to support further classification (e.g., types like "Male/Female"). Following the new guideline, some embodiments annotate 20K Chinese extractive gender identification instances. To leverage large-scale unlabeled corpora, speaker identification (SI) is applied to identify characters and design a multi-task self-training paradigm to further improve the performance of both speaker identification and gender identification by leveraging large-scale unlabeled book corpora. Experimental results show that the resulting semi-supervised models may outperform previous methods on three Chinese novel-based datasets JY, PW, and CLUEWSC by a large margin. For other languages, some embodiments use the mixed-labeled Chinese data to fine-tune a multilingual language model, which surprisingly achieves comparable performance on three English novel-based datasets P&P, Emma, and Steppe to methods trained with rich clean English novel-related annotations.

In some embodiments, to speed up human annotation that traditionally requires book-level understanding, a new annotation guideline for GI is designed and a moderate-sized GI dataset for Chinese is annotated under this guideline. To leverage large-scale unlabeled corpora, a multi-task self-training paradigm is used to iteratively train a multi-task model that can handle both speaker identification and gender identification. To speed up the training, curriculum training is applied after each iteration to select suitable pseudo-labeled data to train the model in the next iteration instead of always using a fixed confidence threshold for data filtering.

Some embodiments resolve the lack of large-scale GI data by simplifying the annotation task and leveraging unlabeled book corpora as well as introduce a multi-task self-training paradigm facilitated by an effective data selection strategy to train a model that can handle both GI and SI. The resulting multi-task model can achieve better performance on GI and SI datasets compared with that of the same backbone models trained with clean data only. This multi-task model can benefit applications that require novel analysis such as character profiling and speech tasks such as text-to-speech as gender is an important style factor for voice.

The following described exemplary embodiments provide a system, method and computer program that identifies gender in a text-based work. Referring now to FIG. 1, a functional block diagram of a networked computer environment illustrating a gender identification system 100 (hereinafter "system") for identifying a gender of a character in a text-based work is depicted. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for identifying a character's gender in a text-based work is enabled to run a Gender Identification Program 116 (hereinafter "program") that may interact with a database 112. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger gender identification program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 4:
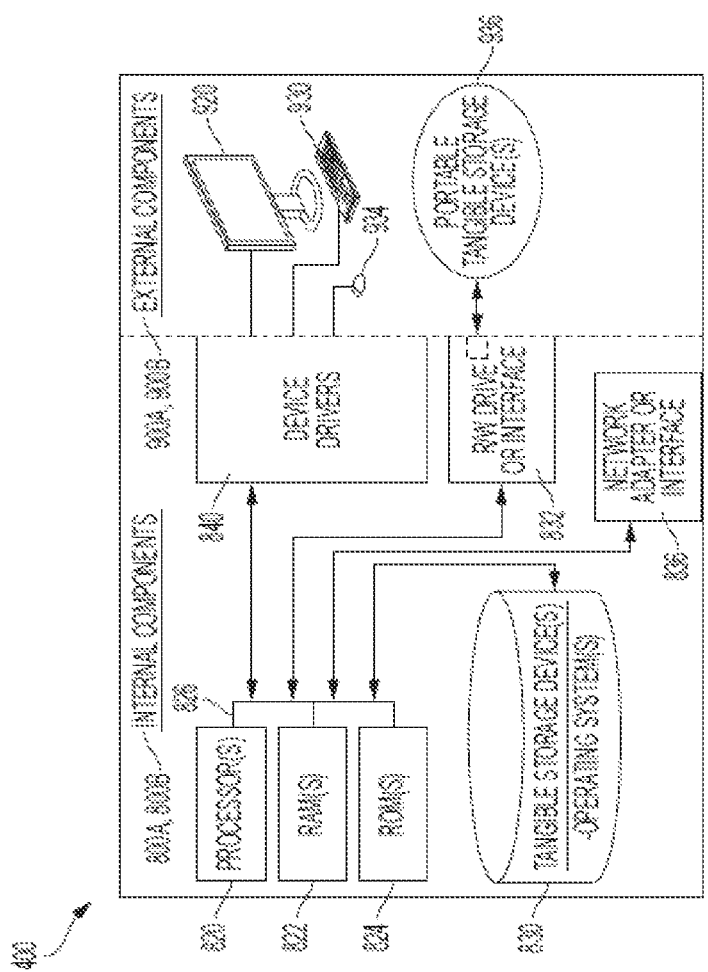
FIG. 4 is a block diagram of internal and external components of computers and servers depicted in FIG. 1 according some embodiments.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Figure 5:
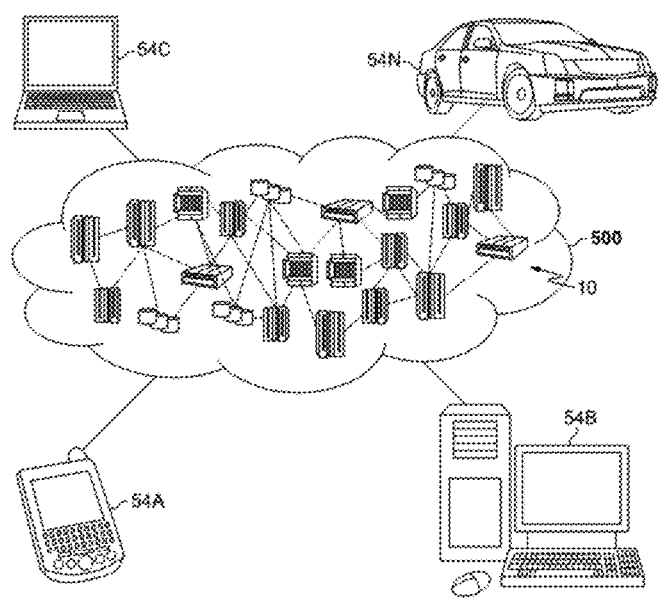
FIG. 5 is a block diagram of an illustrative cloud computing environment including the computer system depicted in FIG. 1, according to some embodiments.

Computer 102 (FIG. 1) and server computer 114 (FIG. 1) may include respective sets of internal components 800A, B and external components 900A, B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A, B.

The one or more operating systems 828, the software program 108 (FIG. 1) and the Gender Identification Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Gender Identification Program 116 (FIG. 1) can be stored on one or more of the respective portable computer-readable tangible storage devices 936, read via the respective R/W drive or interface 832 and loaded into the respective hard drive 830.

Each set of internal components 800A, B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Gender Identification Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Gender Identification Program 116 on the server computer 114 are loaded into the respective hard drive 830. The network may comprise copper wires, optical fibers, wireless transmission, routers, firewalls, switches, gateway computers and/or edge servers.

Each of the sets of external components 900A, B can include a computer display monitor 920, a keyboard 930, and a computer mouse 934. External components 900A, B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stoReferring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
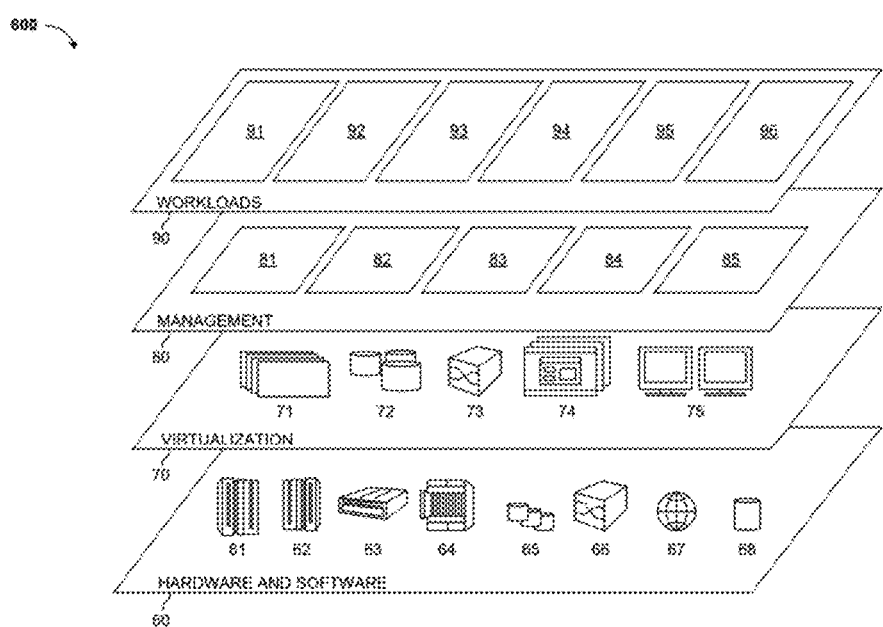
FIG. 6 is a block diagram of functional layers of the illustrative cloud computing environment of FIG. 5, according some embodiments.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Gender Identification 96. Gender Identification 96 may identify a gender in a text-based work.

Given a character and a document, some embodiments define the annotation task as selecting the most informative span about the gender of the character from the document. Sample instances are provided in FIG. 7. FIG. 7 is an English translation of the annotated gender identification examples.

Figure 8:
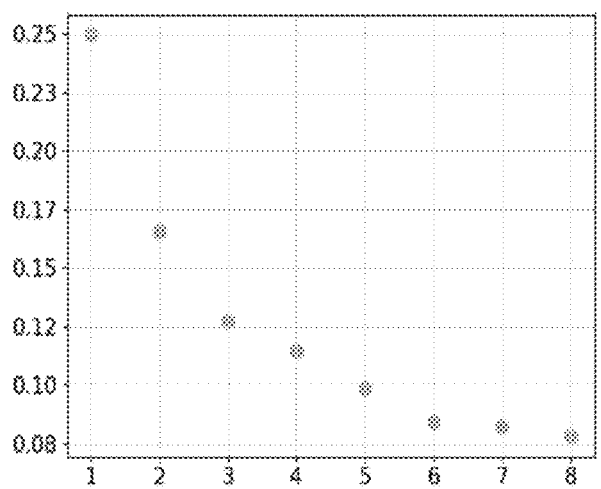
FIG. 8 is a chart showing the position distribution percentage of non-pronoun gender annotations, according to some embodiments.

Some embodiments use the human-annotated speakers in the CSI dataset as the character list and do not use the original document for each speaker in the CSI dataset as informative gender-related information tend to appear in context around the earlier mentions of the characters in a book. During annotation, the first eight mentions of each character are considered to annotate their GI-related information as later gender-related mentions tend to be pronouns such as "he" and "she", which are relatively redundant compared with nouns and adjectives. As shown in FIG. 8, among the annotated gender-related mentions that are different from their corresponding character names, non-pronoun gender annotations are less likely to appear after the first five mentions of characters. For each character mention, the paragraph that includes the character as well as the previous and next paragraphs are used to form the document. If no informative information about gender is provided in the document, the character mention should be selected as the annotated gender-related span. FIG. 9A shows the data statistics of the document.

Some embodiments introduce two objectives for multi-task training. First, inspired by previous speaker identification work, both speaker identification and gender identification are formulated as standard extractive machine reading comprehension tasks-given a document and a question, the task aims to select the answer span from the document to answer the question. The only difference exists in that GI regards the target speaker and gender-related mention as question and answer, respectively, while SI treats the target utterance and its corresponding speaker as the question-answer pair.

To construct the input sequence, some embodiments follow previous work to concatenate a special token [CLS], tokens in a given question q, a special token [SEP], and tokens in the given document d that covers the piece of text q. Two vectors $p_{start}$ and $p_{end}$ are introduced to represent the estimated probabilities of each token in d to be the start or end token of the answer span a that appears in d, respectively. Let $a_{start}$ and $a_{end}$ denote the start offset and end offset of a, respectively.

The multi-task model is optimized with parameters θ by minimizing $\Sigma_{t \in V_{GI,EXT} \cup V_{SI,EXT}} L(t, \theta)$, where $V_{GI,EXT}$ and $V_{SI,EXT}$ represents the set of extractive (EXT) gender identification and speaker identification instances, respectively, and training objective L is defined as:

$$L(t, \theta) = -\log p_{start,\theta}(a_{start} | t) - \log p_{end,\theta}(a_{end} | t)$$

Figure 2:
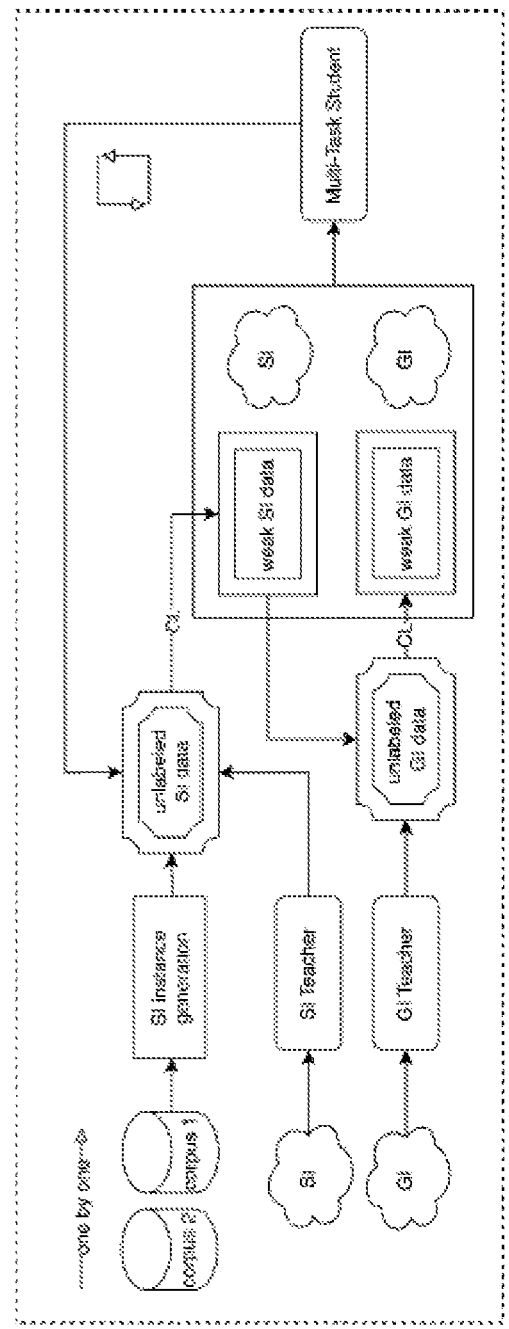
FIG. 2 is continual multi-task self-training framework for gender identification, according to some embodiments.

There is also a trend of formulating a wide range of natural language processing tasks as a text-to-text (T2T) task. The input $x_t$ of instance t is the concatenation of the given question and document, and the output $y_t$ is the answer. Some embodiments simply add "question:" before the question text and "document:" before the document text as a separator, and there is no notable performance improvement by designing more complicated ones as the separators or task indicators (e.g., "who said the following utterance?" before the question text for SI). An objective $\Sigma_{t \in V_{GI,T2T} \cup V_{SI,T2T}} L(t, \theta_e, \theta_d)$ is minimized to train an encoder-decoder model over the mixed-task data:

$$L(t, \theta_e, \theta_d) = -\log P_{\theta_e, \theta_d}(y_t | x_t),$$

where $\theta_e$ and $\theta_d$ represents the parameters of the encoder and decoder, respectively Some embodiments leverage unlabeled corpora to improve the performance as shown in FIG. 2. Previous studies show that iterative training over the same unlabeled corpus does not lead to notable gains for tasks such as SI and propose to let a SI model successively learn from different books in diverse domains written by different authors to improve its generalization ability. Following this paradigm, the model generates n pairwise disjoint sets of unlabeled SI instance $\{W_1, W_2, \ldots, W_n\}$, each based on a unique set of books. In each iteration, the teacher model is applied to an unvisited set of SI instances to generate the pseudo-labels and remove the ones with unclear speaker mentions (e.g., extracted spans are quoted texts). The remaining ones are used as the input to generate pseudo-labeled character gender identification data by replacing the original SI input (target utterance paragraph) with the predicted speaker. The combined SI and GI instances are used for training in each iteration.

As for each unlabeled instance, some embodiments will have a pseudo-labeled instance for each task. Therefore, another problem in this paradigm is the computational cost. Previous multi-task studies set a hard score threshold to select a subset of pseudo-labeled data (e.g., 0.5 for object detection) for denoising and efficiency. However, deep neural networks tend to be overconfident in their predictions: for example in FIG. 9B, given 141K unlabeled SI instances using 0.5 as a confidence score threshold will still keep 98.3% of pseudo-labeled SI data and 89.4% of pseudo-labeled GI instances. The model aims to generate a similar number of instances of different tasks as that of a single task for efficiency yet achieve at least comparable performance. Only r % (budget) is kept of the original pseudo-labeled data for each task. To select data, one natural solution is to sort all the predictions in descending order by the confidence scores and select the top r % data to reduce the effect of noisy labels. However, it is observed that, in continual multi-task self-training, top-ranked pseudo-labeled data even leads to smaller gains than the same size of bottom data, especially when the initial supervised performance of tasks are reasonable. One possible reason might be that the top-scoring ones are relatively easy instances and therefore contribute little additional information to lead to further performance improvements during continual self-training.

Inspired by curriculum learning (CL) that aims to let models learn data from easy to hard, when a model underperforms on a certain task, it is preferred to keep more highly confident data, and the least confident data can be utilized to train a model when the model already has expertise in a task. As there may exist performance differences between tasks and task performance may change after iterations, data selection should be conducted for each task before a new iteration starts. As a first step, data is selected upon simple linear regression for efficiency. More specifically, let $x_i$ % denote the model performance on the task i after the k-th iteration. In iteration k+1, the top $[x_i(1-r), x_i(1-r)+r]$ weakly-labeled data is kept for task i.

For continual multi-task self-training, some embodiments use the annotated gender identification dataset CGI, a speaker identification dataset CSI, and the collected unlabeled corpora. For evaluation, the model uses two Chinese speaker identification datasets WP and JY. For the JY dataset, no gender information is provided. The gender of the 331 speaker mentions is manually annotated in the development set and testing set. Different from JY and WP, there are no overlapped source books across subsets of CSI/CGI. A Chinese Winograd Schema Challenge dataset CLUEWSC is also considered, which aims to predict whether a pronoun is an anaphoric mention of a noun or a noun phrase in a given context. CLUEWSC is chosen for character gender evaluation as the source sentences are from 36 contemporary Chinese novels. FIG. 9B is a table showing the datasets used for the continual multi-task self-training.

Most of the previous studies use an off-the-shelf coreference resolution model to count the number of the female and male anaphoric mentions ("she" and "he") of a character that is recognized by NER, followed by a majority vote. This classical baseline is implemented (Coref in FIG. 10A) using a neural coreference system in CoreNLP. A baseline named "Copy" is implemented, which simply uses the speaker mention as the gender information for each instance. T2T and EXT refer to the two training objectives introduced in Section 3.2.2. Some embodiments experiment with multiple pre-trained models including T5 and BART released by DIALBART, XLM, ROBERTa, and MacBERT.

As shown in FIG. 10B, the continual multi-task self-training may lead to performance improvements on both tasks (7 vs. 1 and 7 vs. 2). Gains are not observed by merely applying multi-task training with clean data (7 vs. 3), which demonstrates the importance of introducing unlabeled data and the effectiveness of the multi-task self-training. The advantage of the CL-based data selection is shown over the baseline without dataset selection (7° vs. 7) by only using half of the pseudo-labeled data, and the CL-based data selection also outperforms other data selection strategies such as keeping the top 50% instances ranked by confidence scores (7° vs. 10). By using the text-to-text training objective for multi-task training, CL-based is also more effective than the other three data selection strategies while slightly underperform the baseline that uses all the pseudo-labeled data. One possible reason might be that some of the answers in the CSI dataset are long utterances (when no speakers exist in the provided context), which may be discarded during selection. Therefore, the trained model tends to generate short answers, which will hurt the overall performance on the CSI dataset (5 vs. 4 in Table 5). Overall, the extractive objective leads to better performance on both tasks, and therefore we mainly focus on it in later experiments.

The performance of the resulting multi-task model is evaluated on existing datasets in a zero-shot setting, which is more practical than supervised settings for real-world applications. The Coref baseline as well as a baseline NB is compared based on 20 million name-gender pairs. The gender identification performance is evaluated over the resulting best-performing multi-task model on public datasets PW, JY, and CLUEWSC. The gender labels of characters (speakers) in PW and JY are binary, while gender can be unclear in the CLUEWSC dataset when the query involves multiple different-gender characters, a query is non-living, there is insufficient evidence to indicate the query's gender, etc. To let NB return unclear labels, we set a threshold score $\lambda$ and regard outputs with scores smaller than/as unclear. We set A to 0.9 based on the NB's performance on the development set of CLUEWSC. NB performs quite well on datasets wherein almost all speakers are person names, as shown in FIG. 10D. However, this method is not designed to handle unnamed characters that are noun phrases such as "host" and "passerby". As shown in FIG. 10E, the performance gap between NB and EXT dramatically widens on CLUEWSC in which the gender of a high percentage of queries (e.g., 38.7% in the test set) is unclear. Also, characters in names are not always independent in meanings, and it is very possible a female or male character is named with a masculine or feminine name. Therefore, it is necessary to exploit context information for more explainable and robust gender identification.

By leveraging multi-lingual pre-trained models, the usefulness of the formulation and Chinese data may be tested without requiring human annotations or translation of the existing training data for a new language. Two settings are experimented with: (i) only use human-labeled clean data for Chinese (i.e., CGI) to train the XML model for the supervised setting and (ii) simply use the combination of CGI and the weakly-labeled gender identification generated based on corpus$_1$ by EXT$_{GI}$ (2 in FIG. 10A) for the semi-supervised setting.

For English datasets, three representative novel-based datasets P&P as well as Emma and The Steppe are considered. As the ground truth binary gender and name alias are provided for annotated 52 characters in P&P, 45 characters in Emma, and 30 characters in The Steppe. The missed gender labels for four aliases in Emma and eleven in The Steppe such as "a woman" are manually added. For each character, his/her full name and the alternative names to generate input (character, context) pairs are considered. Each context contains three paragraphs, and the middle one includes one or multiple mentions of a target character for gender identification. Using the raw texts of the corresponding books, 4,767 instances for P&P, 4,475 instances for Emma, and 702 for The Steppe are generated.

The multilingual performance is compared with that of BookNLP, a pipeline that contains components such as named entity recognition, coreference resolution, and speaker identification trained on annotated English literature datasets. BookNLP is ran over the whole texts in P&P, Emma, and The Steppe based on the referential gender inference results: for all the ground truth alias mentions of each character, if the number of mentions predicted with the category "he/him/his" $n_m$ is bigger than the number of mentions associated with "she/her" $n_f$, the gender of the character is regarded as male, otherwise female. Random gender is assigned with a character when $n_m=n_f$.

The performance of BookNLP is only reported for reference purposes as parts of P&P and Emma are included in the annotated corpora to train components such as coreference resolution in BookNLP for gender inference Furthermore, the results show that it is possible to achieve very promising zero-shot performance on the three English datasets with limited language-specific modifications. There is no data leakage issue as the Chinese versions of the three English novels are not included in CGI. BookNLPprior in FIG. 10F additionally uses prior information on the alignment of names and gender categories drawn from 15K English books.

Figure 3:
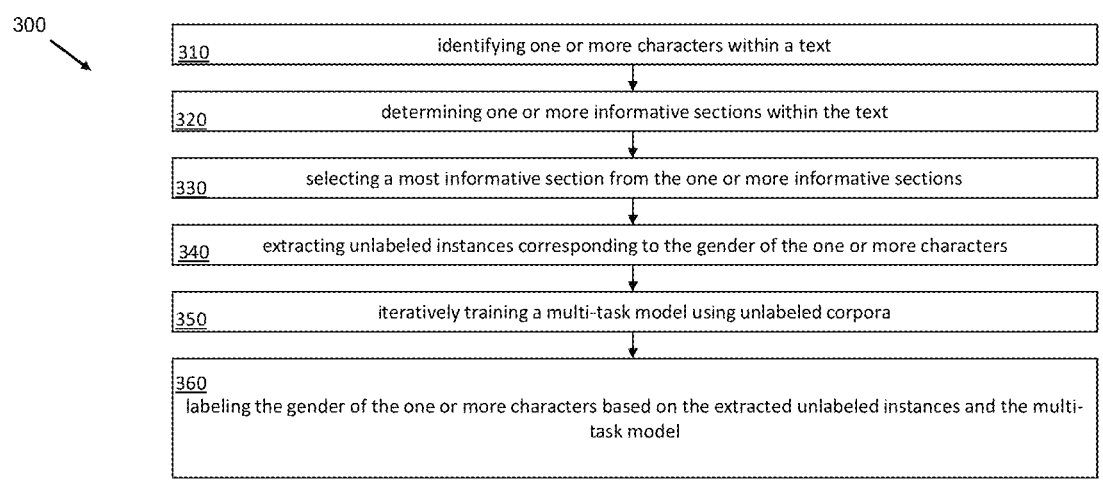
FIG. 3 is an operational flowchart illustrating the steps carried out by a program for identifying gender in a text, according to some embodiments.

FIG. 3 is a flowchart of example process 300 for character gender identification within a text. In some implementations, one or more process blocks of FIG. 3 may be performed by any of the elements discussed above.

As shown in FIG. 3, process 300 may include identifying one or more characters within a text (block 310).

As further shown in FIG. 3, the process 300 may include determining one or more informative sections within the text, the one or more informative sections providing information regarding a gender of the one or more characters within the text (block 320).

As further shown in FIG. 3, the process 300 may include selecting a most informative section from the one or more informative sections (block 330).

As further shown in FIG. 3, the process 300 may include extracting unlabeled instances corresponding to the gender of the one or more characters from the most informative section (block 340).

As further shown in FIG. 3, the process 300 may include iteratively training a multi-task model using unlabeled corpora, the multi-task model performs both speaker identification and gender identification (block 350).

As further shown in FIG. 3, the process 300 may labeling the gender of the one or more characters based on the extracted unlabeled instances and the multi-task model (block 360).

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, implement the operations specified in the flowchart and/or block diagram block or blocks. These computer readable program instructions may also be stored in a computer readable storage medium that may direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method executed by at least one processor, the method comprising:
   identifying one or more characters within a text;
   determining one or more informative sections within the text, the one or more informative sections providing information regarding a gender of the one or more characters within the text;
   selecting a most informative section from the one or more informative sections;
   extracting unlabeled instances corresponding to the gender of the one or more characters from the most informative section;
   iteratively training a multi-task model using unlabeled corpora, the multi-task model performing both speaker identification and gender identification; and
   labeling the gender of the one or more characters based on the extracted unlabeled instances and the multi-task model.

2. The method of claim 1, further comprising applying curriculum training to the multi-task model after each iteration to infer pseudo-labels for each unlabeled instance.

3. The method of claim 1, further comprising:
   identifying a first 8 character mentions of the one or more characters within the text;
   annotating GI-related information based on the first 8 character mentions; and
   forming a document comprising a paragraph that includes the one or more characters, a previous paragraph, and a following paragraph for each character mention.

4. The method of claim 1, wherein the labeled and unlabeled instances correspond to a speaker or quotation.

5. The method of claim 1, wherein the labeled and unlabeled instances correspond to a class token, tokens in a first piece of text containing both an utterance and a separator token, and tokens in a given document that covers the first piece of text.

6. The method of claim 5, wherein two vectors correspond to estimated probabilities of each of the tokens being a starting token or an ending token of an answer span that appears in the second piece of text.

7. The method of claim 1, further comprising performing data selection for gender identification and speaker identification before a new iteration starts.

8. An apparatus comprising:
   at least one memory configured to store program code; and
   at least one processor configured to read the program code and operate as instructed by the program code, the program code comprising:
   identifying code configured to cause the at least one processor to identify one or more characters within a text;
   determining code configured to cause the at least one processor to determine one or more informative sections within the text, the one or more informative sections providing information regarding a gender of the one or more characters within the text;
   selecting code configured to cause the at least one processor to select a most informative section from the one or more informative sections;
   extracting code configured to cause the at least one processor to extract unlabeled instances corresponding to the gender of the one or more characters from the most informative section;
   training code configured to cause the at least one processor to iteratively train a multi-task model using unlabeled corpora, the multi-task model performing both speaker identification and gender identification; and
   labeling code configured to cause the at least one processor to label the gender of the one or more characters based on the extracted unlabeled instances and the multi-task model.

9. The apparatus according to claim 8, wherein the program code further includes applying code configured to cause the at least one processor to apply curriculum training to the multi-task model after each iteration to infer pseudo-labels for each unlabeled instance.

10. The apparatus according to claim 8, wherein the program code further includes
    identifying code configured to cause the at least one processor to identify a first 8 character mentions of the one or more characters within the text;
    annotating code configured to cause the at least one processor to annotate GI-related information based on the first 8 character mentions; and
    forming code configured to cause the at least one processor to form a document comprising a paragraph that includes the one or more characters, a previous paragraph, and a following paragraph for each character mentions.

11. The apparatus according to claim 8, wherein the labeled and unlabeled instances correspond to a speaker or quotation.

12. The apparatus according to claim 8, wherein the labeled and unlabeled instances correspond to a class token, tokens in a first piece of text containing both an utterance and a separator token, and tokens in a given document that covers the first piece of text.

13. The apparatus according to claim 12, wherein two vectors correspond to estimated probabilities of each of the tokens being a starting token or an ending token of an answer span that appears in the second piece of text.

14. The apparatus according to claim 8, wherein the program code further includes data selection code configured to cause the at least one processor to perform data selection for gender identification and speaker identification before a new iteration starts.

15. A non-transitory computer-readable storage medium, storing instructions, which, when executed by at least one processor, cause the at least one processor to:
   identify one or more characters within a text;
   determine one or more informative sections within the text, the one or more informative sections providing information regarding a gender of the one or more characters within the text;
   select a most informative section from the one or more informative sections;
   extract unlabeled instances corresponding to the gender of the one or more characters from the most informative section;
   iteratively train a multi-task model using unlabeled corpora, the multi-task model performing both speaker identification and gender identification; and
   label the gender of the one or more characters based on the extracted unlabeled instances and the multi-task model.

16. The non-transitory computer-readable storage medium according to claim 15, wherein the instructions further cause the at least one processor to apply curriculum training to the multi-task model after each iteration to infer pseudo-labels for each unlabeled instance.

17. The non-transitory computer-readable storage medium according to claim 15, wherein the instructions further cause the at least one processor to:
   identify a first 8 character mentions of the one or more characters within the text;
   annotate GI-related information based on the first 8 character mentions; and
   form a document comprising a paragraph that includes the one or more characters, a previous paragraph, and a following paragraph for each character mentions.

18. The non-transitory computer-readable storage medium according to claim 15, wherein the labeled and unlabeled instances correspond to a speaker or quotation.

19. The non-transitory computer-readable storage medium according to claim 15, wherein the labeled and unlabeled instances correspond to a class token, tokens in a first piece of text containing both an utterance and a separator token, and tokens in a given document that covers the first piece of text.

20. The non-transitory computer-readable storage medium according to claim 19, wherein two vectors correspond to estimated probabilities of each of the tokens being a starting token or an ending token of an answer span that appears in the second piece of text.

* * * * *